United States Patent
DeCia et al.

(10) Patent No.: US 9,919,740 B2
(45) Date of Patent: Mar. 20, 2018

(54) SITUATIONAL DEACTIVATION OF LANE KEEP ASSIST SYSTEM

(71) Applicant: Ford Global Technologies, LLC, Dearborn, MI (US)

(72) Inventors: Nunzio DeCia, Northville, MI (US); Dave A. Herman, Southfield, MI (US); Stephen Jay Orris, Jr., New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 105 days.

(21) Appl. No.: 15/016,624

(22) Filed: Feb. 5, 2016

(65) Prior Publication Data

US 2017/0225711 A1     Aug. 10, 2017

(51) Int. Cl.
| | |
|---|---|
| *B62D 15/02* | (2006.01) |
| *B60W 10/20* | (2006.01) |
| *B60W 30/12* | (2006.01) |
| *B60W 50/08* | (2012.01) |
| *B60W 50/00* | (2006.01) |

(52) U.S. Cl.
CPC .......... *B62D 15/025* (2013.01); *B60W 10/20* (2013.01); *B60W 30/12* (2013.01); *B60W 50/085* (2013.01); *B60W 2050/0026* (2013.01); *B60W 2420/403* (2013.01); *B60W 2510/20* (2013.01); *B60W 2520/14* (2013.01); *B60W 2550/141* (2013.01)

(58) Field of Classification Search
CPC ..... B25D 15/025; B60W 10/20; B60W 30/12; B60W 50/085; B60W 2050/0026; B60W 2420/403; B60W 2510/20; B60W 2520/14; B60W 2550/141

See application file for complete search history.

(56) References Cited

U.S. PATENT DOCUMENTS

| | | | |
|---|---|---|---|
| 7,843,360 B2 | 11/2010 | Ponziani | |
| 8,428,821 B2 | 4/2013 | Nilsson | |
| 2004/0143381 A1* | 7/2004 | Regensburger | ........ B60Q 1/346 701/36 |
| 2008/0120025 A1* | 5/2008 | Naitou | ................... G01C 21/12 701/33.7 |
| 2009/0207012 A1* | 8/2009 | Ponziani | ................... B60Q 9/00 340/457 |

(Continued)

FOREIGN PATENT DOCUMENTS

| | | |
|---|---|---|
| DE | 102007051260 | 4/2009 |
| DE | 102011078946 | 1/2013 |

(Continued)

OTHER PUBLICATIONS

ADASIS ("Advanced Driver Assistant Systems Interface Specifications") Brochure, "The ADAS Horizon Concept", 2002.

(Continued)

*Primary Examiner* — Dale Moyer
(74) *Attorney, Agent, or Firm* — Frank A. MacKenzie; Charles A. Bieneman

(57) ABSTRACT

A method for controlling a lane keep assist system comprises the combination of predicting that a driver may initiate a lane change without using a turn indicator switch and temporarily deactivating the lane keep assist system in response to such prediction.

16 Claims, 5 Drawing Sheets

(56) References Cited

U.S. PATENT DOCUMENTS

| | | | |
|---|---|---|---|
| 2009/0237230 A1* | 9/2009 | Ponziani | B60Q 9/00 340/457 |
| 2013/0085976 A1* | 4/2013 | Bone | B60W 30/18163 706/46 |
| 2013/0231830 A1 | 9/2013 | Van Dan Elzen | |
| 2016/0033964 A1* | 2/2016 | Sato | B60K 28/06 701/24 |
| 2017/0148327 A1* | 5/2017 | Sim | G08G 1/167 |
| 2017/0190334 A1* | 7/2017 | Zelman | B60W 40/09 |

FOREIGN PATENT DOCUMENTS

| | | |
|---|---|---|
| EP | 1918896 A1 | 7/2008 |
| WO | 2011003659 A1 | 1/2011 |
| WO | 2011101212 A1 | 8/2011 |

OTHER PUBLICATIONS

"Assistance Systems", Porsche Macan S Diesel, Porsche Deutschland, Sep. 30, 2015.
UKIPO Search Report under Section 17(5) for Application No. GB1701732.8 dated Jul. 14, 2017 (3 pages).

\* cited by examiner

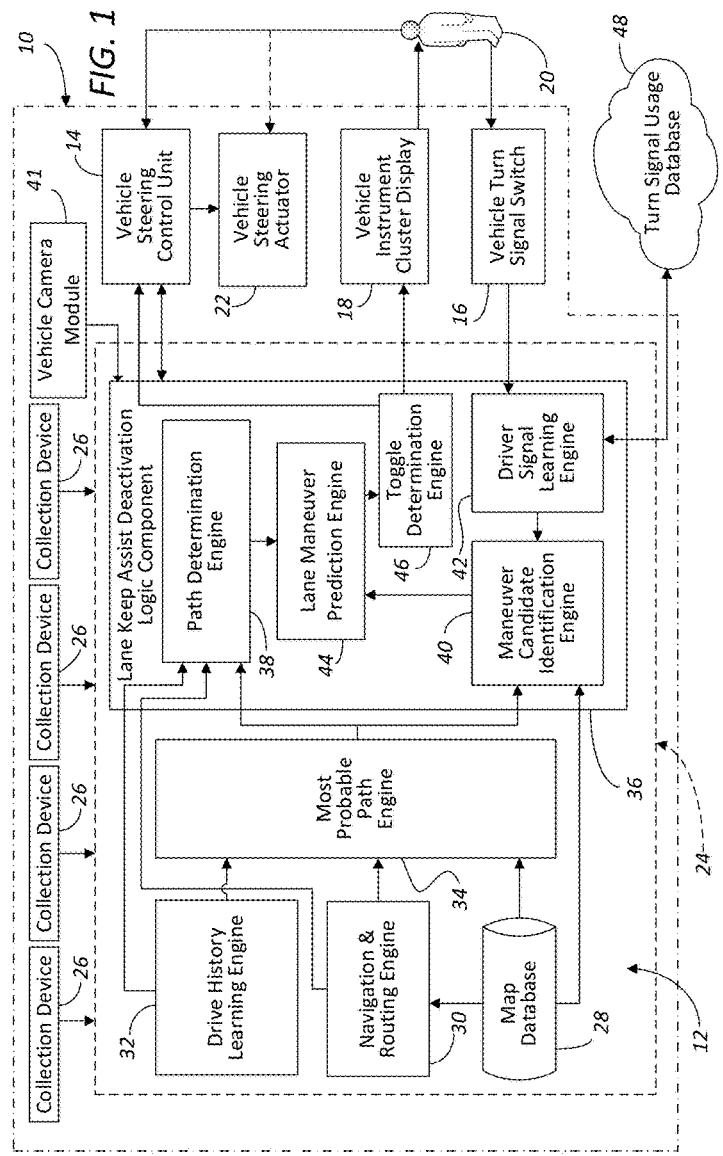

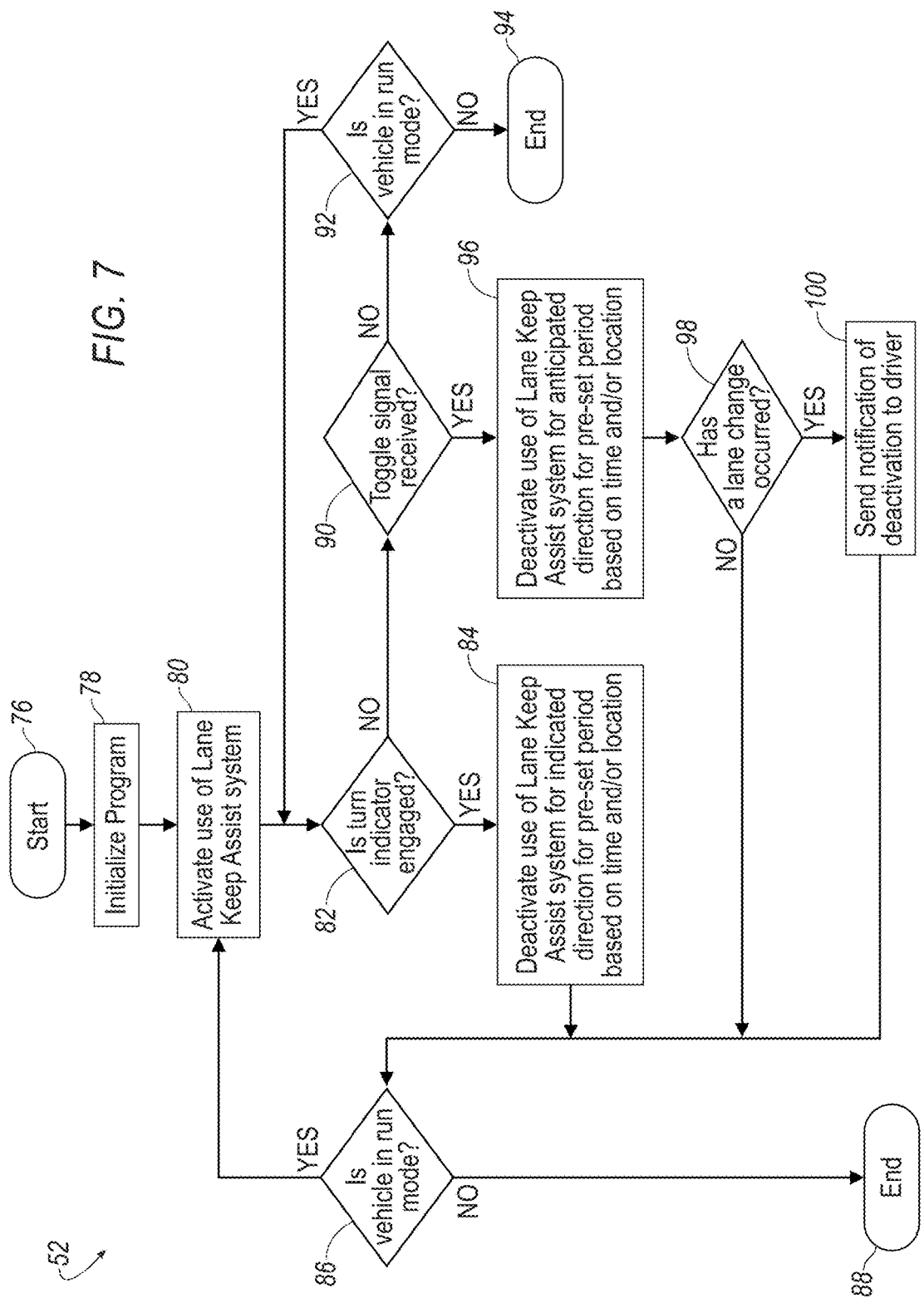

SITUATIONAL DEACTIVATION OF LANE KEEP ASSIST SYSTEM

BACKGROUND

Active lane guidance systems, also known as lane keep assist ("Lane Keep Assist") systems, are able to, through the use of stored data, sensed real-time data and computer logic, maintain a vehicle in a traffic lane. While such systems are convenient and practical, they can confuse a driver in cases when the driver initiates a maneuver not expected by the system, as when the driver moves the steering wheel with an intent to exit the lane without first having indicated the intent by engaging the turn indicator switch. When this occurs, the Lane Keep Assist system will attempt to steer the vehicle back into the center of the lane even though the driver intends to depart the lane. This may commonly happen in cases where a freeway or road branches out an additional lane (branch lane) and the branch lane is detected by the vehicle's front camera module. Since the branch lane has just branched out, the likelihood of another vehicle already being in the lane is very low, and a driver may neglect to engage the turn indicator switch. Likewise, several typical freeway exits branch out in similar manners which could also lead to a driver neglecting to engage the turn indicator switch.

BRIEF DESCRIPTION OF THE DRAWINGS

FIG. 1 is a schematic view of a vehicle incorporating an exemplary steering management system.

FIG. 7 is a flow chart of an exemplary assist function deactivation logic.

DETAILED DESCRIPTION

Introduction

Figure 4:
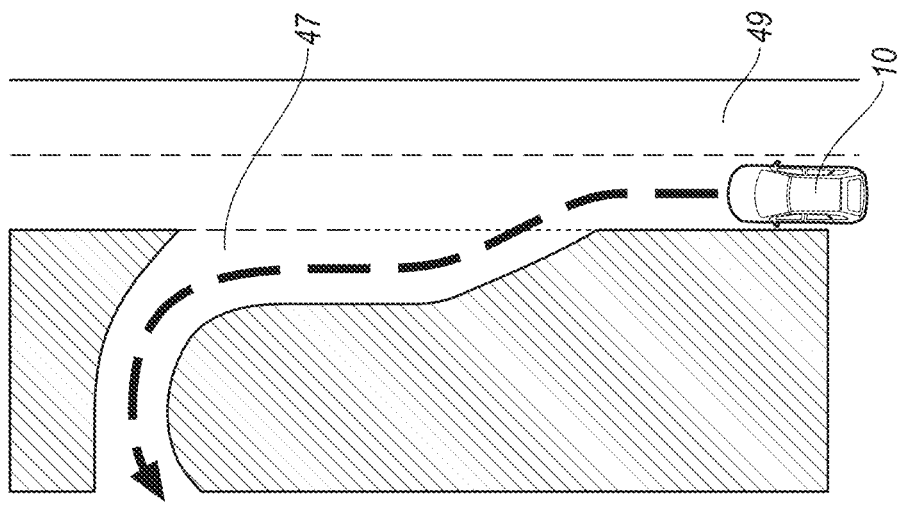
FIG. 4 is an overhead view of a third exemplary lane change maneuver.

Disclosed herein are systems and methods for selectively and temporarily deactivating the functionality of a Lane Keep Assist system. For example, a system as presently disclosed temporarily deactivates the Lane Keep Assist system to enable a driver to change lanes without sustained opposition by the Lane Keep Assist system.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

Exemplary System Elements

FIG. 1 is a schematic diagram of a Lane Keep Assist system 12 in a vehicle 10. Lane Keep Assist system 12 interfaces with a vehicle steering control unit 14 and a turn indicator switch 16 and a vehicle instrument cluster display 18. A driver 20 also interfaces with turn indicator switch 16 and the steering control unit 14. A vehicle steering actuator 22 responds to input from the steering control unit 14. Exemplary Lane Keep Assist system 12 is disposed at least in part in a vehicle computer 24, which could be a controller or an electronic control unit (ECU) such as is known. Computer 24 includes at least one electronic processor and an associated memory. The memory includes one or more forms of computer-readable media, and stores instructions executable by the processor for performing various operations, including such operations as disclosed herein.

The memory of computer 24 further generally stores remote data received via various communications mechanisms; e.g., computer 24 is generally configured for communications on vehicle network such as an Ethernet network or a controller area network ("CAN") bus or the like, and/or for using other wired or wireless protocols, e.g., Bluetooth, etc. Computer 24 may also have a connection to an onboard diagnostics connector such as an OBD-II connector. Via the CAN bus, OBD-II, Ethernet, and/or other wired or wireless mechanisms, computer 24 may transmit messages to various devices in a vehicle and/or receive messages from the various devices, e.g., controllers, actuators, sensors, etc. as discussed herein. Although computer 24 is shown as a single computer in FIG. 1 for ease of illustration, it is to be understood that computer 24 could in fact include and various operation described herein could be carried out by one or more computing devices, e.g., vehicle component controllers such as are known and/or a computing device dedicated to the system 12.

The memory of computer 24 generally stores the collected data. Data may include data collected from a variety of devices. Data may additionally include data calculated therefrom in computer 24. In general, collected data may include any data that may be gathered by any data collection device 26 and/or computed from such data. Exemplary collection devices include ultrasonic sensors, cameras, 360-view cameras, radar, V2V, V2I, Lane Guidance, Lidar and/or data collection devices that collect dynamic vehicle data, such as velocity, yaw rate, steering angle, etc.

The Lane Keep Assist system 12 includes the hardware referenced above, software programming, and closed-loop control systems for vehicle steering and speed control that cooperatively maintain a vehicle in a traffic lane. Examples of such systems are found in cars presently undergoing tests on public roads, including cars operated by Ford Motor Company, Delphi Automotive PLC, Audi AG and others. Known software programming, such as a most probable path software engine 34, described below, aids in navigation and lane tracking. The exemplary element used to predict the need for Lane Keep Assist deactivation are found in a Lane Keep Assist deactivation logic component 36, described in greater detail below.

The foregoing examples are not intended to be limiting; other types of data collection devices 26 could be used to provide data to computer 24. For example, various controllers in vehicle 10 may operate to provide data via a communications bus, e.g., data relating to vehicle speed, acceleration, steering angle, etc. Further, sensors or the like, global positioning system (GPS) equipment, etc., could be included in a vehicle and configured as to provide data directly to computer 24, e.g., via a wired or wireless connection. Further, sensors other than sensors mentioned above are known and may be used for determining vehicle 10 speed, heading, steering angle, etc. For example, steering control unit 14 may be used to provide data on driver steering wheel input to computer 24.

The memory of computer 24 further generally stores data such as map data, route data, road geometry data, driver habits such as turn indicator switch use, and lane maneuver candidates that vehicle 10 may encounter according to various criteria.

Figure 6:
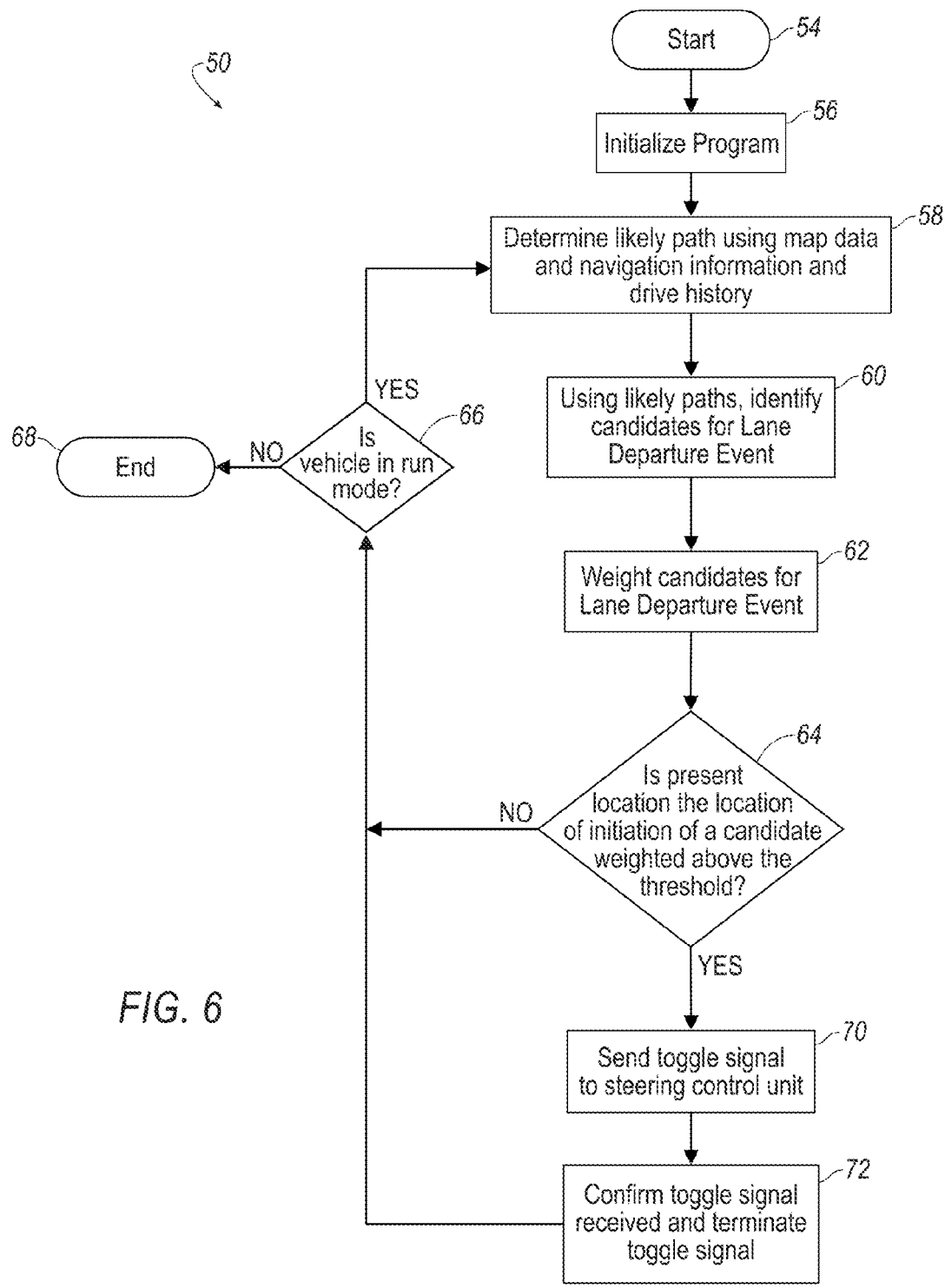
FIG. 6 is a flow chart of exemplary toggle decision logic.

Schematic representations of exemplary software components of exemplary computer 24 are illustrated in FIG. 1. As used herein, a "software component" is programming such as is known to those skilled in the art to accomplish various operations attributed to a respective component as herein described. Certain software components may store and/or calculate data, e.g., the map database 28 as described below. Flow charts illustrating processes 50, 52, to be implemented as computer programs including various components described in the system 12, are illustrated in FIGS. 6 and 7. The precise structure of computer 24 and arrangement of memory and software therein is not critical to the present description.

FIG. 1 provides an exemplary schematic representation of an arrangement of components in a vehicle 10, including a computer 24 and exemplary software components that may execute thereon to manage a Lane Keep Assist system 12. Certain of the components are available commercially and/or by joining cooperative enterprises that have developed such components. Available components include a map database 28, a navigation and routing engine 30, a drive history learning engine 32, and a most probable path engine 34.

Exemplary map database 28 is built using a geographic information service ("GIS") which employs digitized geographic information. Such geographic information may be derived from maps, aerial photographs, and global positioning system ("GPS") data. Such map data is available from companies such as HERE Global BV Corporation (Netherlands).

An exemplary navigation and routing engine 30 includes programming to determine, based on map database 28, a route between two points. The route choice can be varied, depending on variables including the requestor's preference between limited access expressway and surface streets. If supplemental data is available for real-time traffic conditions, and the requestor expresses a preference for routes having minimal travel time, such traffic conditions are factored into the route choice. Algorithms for determining routes according to such factors are known to those skilled in the art.

An exemplary drive history learning engine 32 stores past routes and the locations of past lane changes. Drive history learning engine 32 retains the most recent 60 days of driver data. If less than 60 days of data is available, the available data is weighted to reflect all recorded events having the same frequency of occurrence for the entire 60 days. For example, if data has only been recorded for 30 days, and two turns were noted at a particular location, the data would be weighted as if there had been four turns over 60 days. The exemplary drive history learning engine 32 also includes programming to, based on a frequency of occurrence of lane changes associated with certain routes, learn as a function of signals of data such as the immediately preceding route, and factors considered by the navigation and routing engine 30 such as destination and traffic conditions, and which routes and lane changes are most likely to be made. The exemplary learning engine 32 includes programming to associate lane changes with particular branch lanes and accumulate a history of lane changes for particular branch lanes, storing the day of the week and time of day of all such events.

An exemplary most probable path engine 34 includes programming to select a route based on data from the navigation and routing engine 30. Most probable path engine 34 generates a virtual horizon using the data from the map database 28 and the navigation and routing engine 30 and information from collection devices 26 such as those identified above and vehicle-to-vehicle data. The virtual horizon includes a collection of road segments reachable from the current positioning of vehicle 10, and how likely it is that vehicle 10 will eventually travel to each road segment. When the driver has selected a route, the most probable path engine 34 selects that route. The most probable path engine 34 may modify the route in accord with data provided by the drive history learning engine. In the event that the driver 20 has not selected a route, most probable path engine 34 relies on the virtual horizon to generate a most probable path, concentrating on a single path that is most likely to be taken, along with information about crossings such as branch lanes. Most probable engine path 34 can also be configured to provide a path expansion mode in which road segment data is provided for available paths at each intersection or junction. Such functionality is supported by a cooperative undertaking characterized as Advanced Driver Assistant Systems Interface Specifications (ADASIS) with members including vehicle manufacturers and suppliers to the same. The virtual horizon may alternatively be characterized as an ADAS horizon.

The exemplary Lane Keep Assist deactivation logic component 36 includes as constituent sub-components a path determination engine 38, a maneuver candidate identification engine 40, a driver signal learning engine 42, a lane maneuver prediction engine 44 and a toggle determination engine 46. An exemplary vehicle camera module 41 provides input to component 36 for use by the software engines therein. Vehicle camera module 41 may alternatively be characterized as one of sensors 26.

Exemplary path determination engine 38 receives as input the virtual horizon from most probable path engine 34, and direct input from drive history learning engine 32 and navigation and routing engine 30, and selects a path that is provided as output. An extended lane model of most probable path engine 34 provides enhanced road connectivity data to facilitate identifying candidates for lane departure events. The virtual horizon produced by most probable path engine 34 is supplemented by sensory data, especially camera data, which is used to generate the output data of the path determination engine.

Maneuver candidate identification engine 40 also receives data from map database 28 and the virtual horizon from the most probable path engine 34, as well as feedback from driver signal learning engine 42. Exemplary maneuver candidate identification engine 40 calculates a likelihood of a particular road segment or branch lane having no other vehicles in it prior to an anticipated lane departure.

Exemplary driver signal learning engine 42 logs and analyzes occurrences of turn indicator switch 16 being actually used. Turn indicator switch usage data generated within vehicle 10 for particular branch lanes can be supplemented by turn indicator switch usage data from other vehicles maintained in a centralized cloud storage 48 with such data including information on where such turn indicator behavior occurs. Data from vehicle 10 is supplied to the cloud data in exchange for use of the cloud data. Driver signal learning engine 42 helps to improve the overall accuracy of the maneuver candidate identification engine 40 over time, and results in better prediction of when to toggle, that is, temporarily disable, the Lane Keep Assist system 12. The term "cloud" as used herein refers to a network such as is known, such as the Internet, that allows for accessing and storing data via remote computers.

The lane maneuver prediction engine 44 takes the output of maneuver candidate identification engine 40 and path determination engine 38 and determines where a driver is most likely to exit the current lane for a branch lane. The lane maneuver predictive engine 44 identifies candidates for key "lane departure events" along the path chosen by path determination engine 38. As vehicle 10 moves along the path, the candidates are weighted or scored for the likelihood of driver 20 making a lane change into the candidate branch lane without engaging the turn indicator switch 16. Candidates scored above a pre-determined threshold will be characterized as predicted lane changes, resulting in the Lane Keep Assist system 12 being disengaged until the predicted maneuver has passed. The scores shall be supplemented by the nature of the maneuver and the road network geometry at that point in the path. An exemplary weighting applied to a branch lane applies weighting factors to variables including:

Factor 1, an Active Segment Route bool equaling 1 when subject branch lane is on the current/active route and 0 when it is not;

Factor 2, a number of times in the present drive that the driver has varied from an anticipated route;

Factor 3, a number of times in the last 60 days that the driver has selected this branch lane on this particular day of the week;

Factor 4, a number of times in the last 60 days that the driver has selected this branch lane at this particular time of day, the time of day being separated into two hour blocks of time;

Factor 5, a likelihood of the branch lane being empty over the last 60 days; and Factor 6, a percentage of the number of times a turn indicator switch 16 has not been used for the subject branch lane relative to the total number of times the branch lane has been chosen over the last 60 days.

Figure 3:
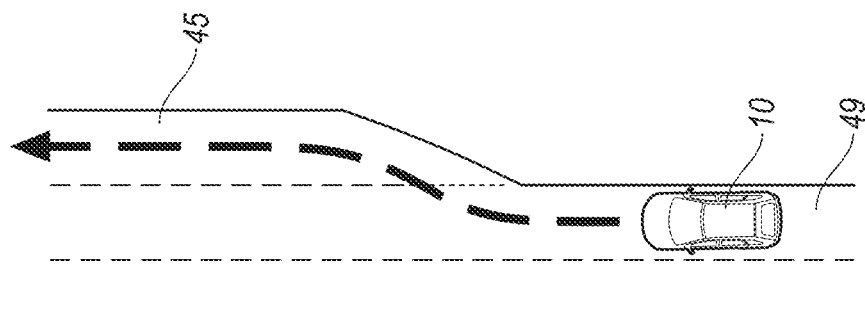
FIG. 3 is an overhead view of a second exemplary lane change maneuver.
Figure 2:
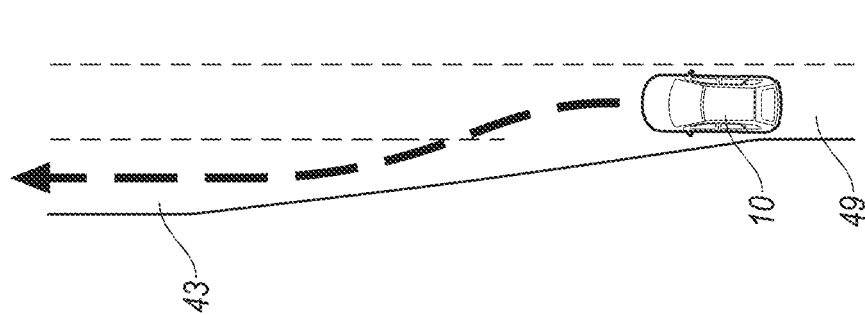
FIG. 2 is an overhead view of a first exemplary lane change maneuver.

Exemplary point weightings for Factors 1 through 6 are, respectively, 100 points, −20 points, 5 points, 1 point, 40 points and 10 points. Notable examples of branch lanes serving as candidates for lane departure events from primary path road lanes 49 include an expanding expressway lane 43, a freeway off-ramp exit lane 45, and a boulevard U-turn lane 47 as depicted in FIGS. 2, 3, and 4 respectively. An exemplary output of engine 44 is the sum of the six weighting factors multiplied by their respective point weightings. Examples of such weightings are provided below.

Figure 5:
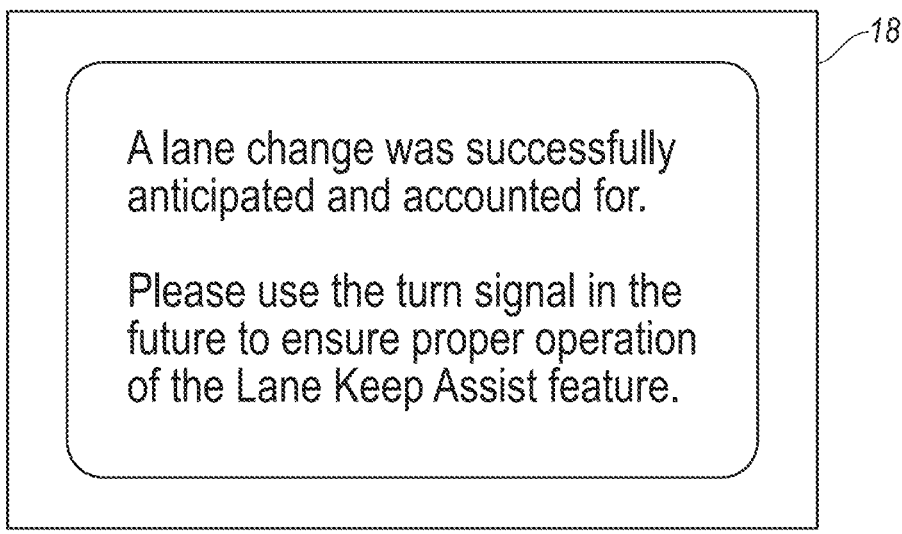
FIG. 5 is a view of an exemplary driver cluster display.

Toggle determination engine 46 assesses the output of the lane maneuver prediction engine 44 and compares it to a toggle determination threshold value to determine whether a predicted lane departure should result in a temporary deactivation of the Lane Keep Assist system 12. An exemplary temporary deactivation threshold value ($TD_{tv}$) could be set to 65. When the output of engine 44 exceeds 65 points, the toggle determination engine 46 temporarily disengages the Lane Keeping Assist system 12 in the direction of the available lane to prevent driver confusion and dissatisfaction being induced by having to "fight" with the steering wheel to depart the lane. The Driver is notified of the toggling of the Lane Keep Assist system 12 via an HMI Notification on the vehicle's display, as illustrated in FIG. 5, where the Lane Keep Assist system HMI currently resides. Upon either completion of the lane change, or maintaining its path along lanes 49, the Lane Keep Assist system 12 is reactivated in the lane in which vehicle 10 finds itself.

Processing

Processes 50 and 52, illustrated in FIGS. 6 and 7, respectively, are example processes that may be executed in a computer 24. The computer 24, as shown in these figures, can include programming to interrupt or disable or deactivate the Lane Keep Assist system 12 when it is predicted that driver 20 may initiate a lane change without using the turn indicator switch 16. The computer 24 is programmed to send a signal indicating that the vehicle 10 is in a location where there is a significant likelihood that the driver will change lanes to a predicted available lane without signaling. The computer 24 is further programmed, responsive to the signal, to temporarily deactivate the Lane Keep Assist system 12, allowing the driver to changes lanes unopposed in a direction of the predicted available lane. Exemplary signals, i.e., messages sent via the vehicle 10 communications network, include the setting of a memory value by a computer program executing logic diagram 50, with that memory value being read by computer 24, or alternatively, a continuous voltage signal being terminated when a lane change window is closed. An example of a lane change window being closed is when the branch lane is no longer available, e.g., the branch lane has separated from primary path road lanes 49. Process flows 50 and 52 present just a single example of how the temporary disablement of the Lane Keep Assist system 12 can be achieved. The above undertakings of computer 24 are conducted substantially continuously. Computer 24 substantially continuously receives route data and location data and substantially continuously determines whether to deactivate lane assist based at least in part on the substantially continuously received route data and the substantially continuously received lane location data Computer 24 executes the steps illustrated in FIG. 6 as described below. The computer program executing process 50 is initiated in start block 54. The computer program is initialized in process block 56. The initialization routine of block 56 includes conventional operations including zeroing the registers, reading program instructions from a static memory or other storage into the controller's random access memory ("RAM"), and other low-level software steps well-known in the software art, and not critical to the present description.

Next, in a block 58, a likely path is determined using the virtual horizon consistent with the description of the function of the path determination engine 38. Next, in a block 60, where, as per the description of maneuver candidate identification engine 40, the virtual horizon of most probable path engine 34 and map database 28 provide data used to determine where driver 20 is most likely to exit the current lane.

Following process block 60, process block 62, in accord with the description of lane maneuver prediction engine 44, scores the candidates identified in block 60 and establishes a weighted candidate value. The weighted candidate value corresponds to the output of lane maneuver prediction engine 44. Exemplary decision block 64 compares the location of vehicle 10 to the location of candidates scored above a pre-determined threshold. The comparison corresponds to the comparison made by toggle determination engine 46 in comparing the output of engine with $TD_{tv}$. When vehicle 10 is determined not to be at the location of a sufficiently scored candidate, the process 50 next executes a decision block 66 to confirm that vehicle 10 is in a run mode. The run mode is characterized by the vehicle being is in an operating condition ready for driving, i.e., when, for example the engine or motor is running or in an "on"

condition and the transmission is in a driving range. The run mode is distinguished from a parked condition when, for example, the engine or motor is not activated, and, optionally, a transmission park pawl is engaged or a parking brake is engaged. When the vehicle is not in the run mode, the program moves to end block 68 and terminates. When vehicle 10 is in the run mode, the program returns to block 58. When vehicle 10 is determined in decision block 64 to be at the location of a sufficiently scored candidate, the program moves to a block 70.

In the process block 70, the computer 24 commands the sending of a toggle signal to steering control unit 14 for the purpose of temporarily deactivating the steering assist. In the present example, process block 72 terminates the toggle signal upon confirmation of receipt of the toggle signal by steering control unit 14. The program moves to decision block 66 to check on whether vehicle 10 is in the run mode, proceeding as indicated above.

Computer 24 executes the steps illustrated in FIG. 7 as described below. The process 52 is initiated in start block 76. The computer program is initialized in process block 78. The initialization routine of block 78 includes conventional operations including zeroing the registers, reading program instructions from a static memory or other storage into the controller's random access memory ("RAM"), and other low-level software steps well-known in the software art, and not critical to the present description.

Next, in a block 80, the computer 24 activates use of the Lane Keep Assist system 12. Decision block 82 is executed next. Decision block 82 determines whether the turn indicator switch 16 has been engaged. If not, a block 90 is executed next.

When switch 16 is engaged, the process 52 moves to a block 84, in which the Lane Keep Assist system 12 is deactivated in just a direction of the branch lane while the branch lane is available. An exemplary determination of window closure is made by computer 24 based on available GPS information and camera module 41 information, with the GPS being one of the above-referenced data collection devices 26. Imaginary or virtual boundaries can be established for the initiation and termination of the deactivation. An initiation boundary would be associated with the initial availability of a branch lane. A termination boundary would be associated with the end of the branch lane availability. Such boundaries can be established based on a combination of inputs, including camera information and GPS information. When vehicle 10 crosses the initiation boundary, the driver is able to steer the vehicle to the available branch lane without resistance from Lane Keep Assist system 12. Upon crossing the termination boundary, the driver will be aided by the Lane Keep Assist system 12. Nothing in the preceding is inconsistent with initiating deactivation with the occurrence of both a turn indicator switch engagement indicating an intent to change lanes in a first direction, and the availability of a lane in the direction indicated.

Following is a first example of calculating the weighted output value of lane maneuver prediction engine 44 of the above-described system 12. An exemplary drive is initiated at 8:45 on a Tuesday morning. The driver selects a route using the navigation engine 56. The route selected by the navigation engine 56 is characterized as an active route. Travel on the active route is initiated with the driver driving toward his destination. Before the driver has reached a particular branch lane, the driver has deviated from the selected route four times, with the active route being recalculated each time prior to reaching the branch lane. The branch lane is included as part of the active route. That is, the navigation engine 56 directs the driver to choose this branch lane. On Tuesdays in the past 60 days (eight or nine in total), the driver has chosen this branch lane a total of 5 times. In all of the same two-hour time windows (7:45 am-9:45 am) in the past 60 days, the driver has chosen this segment at this junction a total of 17 times (of a possible 60). The branch lane is of a combined exit ramp-entrance ramp type. That means other vehicles are entering the route that the navigation engine 56 is recommending exiting from. The shared usage is associated with a Route Geometry Analysis report indicating the likelihood of the branch lane being an empty lane as only 20%. Based on past turn indicator switch usage as provided by driver signal learning engine 42, the likelihood of the driver not using the turn indicator switch at this particular junction, and making the turn into the branch lane anyway, is 20%. A value is calculated for the branch lane to determine the weighted output value of lane maneuver prediction engine 44 of the above-described system 12. Putting the weighting into the form of an equation, and calculating: (100 pts)(1)+(−20 pts)(4)+(5 pts)(5)+(1 pt)(17)+(40 pts)(0.20)+(10 pts)(0.20)=72 pts. Given a $TD_{rv}$ set to 65 pts, that means this particular segment would qualify (i.e. is above threshold) for an LKA deactivation if the driver chooses to take the exit ramp without engaging the turn indicator switch 16.

Following is a second example of calculating the weighted output value of lane maneuver prediction engine 44 of the above-described system 12. An exemplary drive is initiated at 6:30 on a Saturday evening. The driver does not use the navigation engine 56 to select a route. Travel on the selected route, characterized as not an active route, is initiated with the driver driving toward his destination. On Saturdays in the past 60 days (eight or nine in total), the driver has chosen this branch lane a total of 3 times. In all of the same two-hour time windows (5:30 pm-7:30 pm) in the past 60 days, the driver has chosen this segment at this junction a total of 8 times (of a possible 60). The Road Geometry Analysis reports an empty lane likelihood of 90%, as the on-ramp has branched as a new lane from the current road. Based on past turn indicator switch usage as provided by the driver signal learning engine 42, the likelihood of the driver not using the turn indicator switch 16 at this particular junction, and making the turn into the branch lane anyway, is 50%. Putting the weighting into the form of an equation, and calculating: (100 pts)(0)+(−20 pts)(0)+(5 pts)(3)+(1 pt)(8)+(40 pts)(0.90)+(10 pts)(0.50)=64 pts. Given a $TD_{rv}$ set to 65 pts, this segment would not qualify for an LKA deactivation if the driver chooses to take the ramp without engaging the turn indicator switch 16.

A block 86 is executed following the block 84 to determine if the vehicle 10 is in a run mode. When the vehicle 10 is not in a run mode, then the program moves to end block 88 and terminates. When the vehicle is still in the run mode, then the program moves to block 80, ensuring that the Lane Keep Assist system has been reactivated.

When the computer 24 in the block 82 determines that switch 16 is not engaged, the process 52 moves to decision block 90 to determine if the toggle signal has been received. If the toggle signal has not been received, then program moves to decision block 92 to check if the vehicle is in the run mode. When the vehicle 10 is not in the run mode, the program moves to end block 94 and terminates. When the vehicle is in the run mode, the program moves back to decision block 82 to determine if the turn indicator switch 16 is engaged.

When the computer 24 in the block 90 determines that the toggle signal has been received, the process 52 moves to process block 96 and temporarily deactivates or disables Lane Keep Assist system 12. The process 52 then moves to decision block 98, checking on whether a lane change has occurred. When a lane change has occurred, the program moves to process block 100, causing the instrument cluster display 18 to display a message viewable by driver 20 such as in FIG. 5 indicating that the system 12 predicted the lane change that was not signaled and advising drive 20 to signal in the future. The program then moves to decision block 86 to determine if the vehicle is in the run mode. The program proceeds from block 86 as indicated above. When decision block 98 determines that there has been no lane change, the program proceeds to block 86, and proceeds from there as indicated above.

The above processes 50, 52 are exemplary illustrative examples and are not intended to be limiting. For example, the run mode inquiry decision block are included primarily to avoid the possibility of the programs continually looping. It is also possible to integrate the programs of FIGS. 6 and 7 into a single program illustrated by a single flow chart. However, separate flow charts were employed for the purpose of clarity.

CONCLUSION

Disclosed herein is a method and a system for executing a method to interrupt or disable or deactivate a Lane Keep Assist system when it is predicted that the driver may initiate a lane change without using the turn indicator switch. The description provided herein is intended to be illustrate one or more examples of the disclosed idea, but is not intended to describe all possible variations of the disclosed idea.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to computers in the present description, computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of controlling a lane keep assist system, the method comprising:
    collecting, in a computer, data concerning a vehicle's traversal of a route;
    using the data to predict that, at a location on the route, a driver will initiate a lane change without using a turn indicator switch; and
    temporarily deactivating the lane keep assist system in response to such prediction.

2. The method of claim 1, wherein the lane change is from a primary path road lane to a branch lane and the collected data includes a geographic location of the branch lane.

3. The method of claim 1, wherein the collected data includes turn indicator switch usage history data.

4. The method of claim 1, wherein the collected data includes historic lane change data.

5. The method of claim 2 wherein predicting includes scoring each branch lane for a likelihood that the driver will make a lane change to the branch lane without engaging the turn indicator switch, and selecting as predicted branch lanes the branch lanes having greater than a pre-determined score.

6. The method of claim 1, wherein the lane keep assist system when deactivated is deactivated only in a direction of a branch lane.

7. The method of claim 1, wherein the data includes whether the branch lane is part of an active route, and a road geometry.

8. The method of claim 1, wherein the computing device substantially continuously receives route data and location data and substantially continuously determines whether to deactivate lane assist based at least in part on the substantially continuously received route data and the substantially continuously received lane location data.

9. A system for controlling a lane keep assist system, comprising a computing device that includes a processor and a memory, the memory storing instructions executable by the processor to:
- collect, in a computer, data concerning a vehicle's traversal of a route;
- use the data to predict that a driver will initiate a lane change without using a turn indicator switch; and
- temporarily deactivate the lane keep assist system in response to such prediction.

10. The system of claim 9, wherein the lane change is from a primary path road lane to a branch lane and the collected data includes a geographic location of the branch lane.

11. The system of claim 9, wherein the collected data includes turn indicator switch usage history data.

12. The system of claim 9, wherein the collected data includes historic lane change data.

13. The system of claim 12 wherein predicting includes scoring each branch lane for a likelihood that the driver will make a lane change to the branch lane without engaging the turn indicator switch, and selecting as predicted branch lanes the branch lanes having greater than a pre-determined score.

14. The system of claim 9, wherein the lane keep assist system when deactivated is deactivated only in a direction of a branch lane.

15. The system of claim 9, wherein the data includes include whether the branch lane is part of an active route, and a road geometry.

16. The system of claim 9, wherein the computing device continuously receives route data and location data and continuously determines whether to deactivate lane assist based at least in part on the continuously received route data and the continuously received lane location data.

* * * * *

UNITED STATES PATENT AND TRADEMARK OFFICE
CERTIFICATE OF CORRECTION

PATENT NO. : 9,919,740 B2
APPLICATION NO. : 15/016624
DATED : March 20, 2018
INVENTOR(S) : Nunzio DeCia et al.

Page 1 of 1

It is certified that error appears in the above-identified patent and that said Letters Patent is hereby corrected as shown below:

In the Claims

Column 12, in Lines 17 and 18, replace "wherein the data includes include whether the branch lane" with -- wherein the data include whether the branch lane --.

Signed and Sealed this
Fifteenth Day of May, 2018

Andrei Iancu
*Director of the United States Patent and Trademark Office*